(12) United States Patent
Nagase et al.

(10) Patent No.: US 9,045,240 B2
(45) Date of Patent: Jun. 2, 2015

(54) FLIGHT CONTROL DEVICE, SPACECRAFT, AND REFERENCE TRAJECTORY CORRECTING METHOD

(75) Inventors: Tetsuya Nagase, Tokyo (JP); Atsushi Sasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/131,502

(22) PCT Filed: Jul. 11, 2012

(86) PCT No.: PCT/JP2012/067646
§ 371 (c)(1),
(2), (4) Date: Jan. 8, 2014

(87) PCT Pub. No.: WO2013/008830
PCT Pub. Date: Jan. 17, 2013

(65) Prior Publication Data
US 2014/0136029 A1    May 15, 2014

(30) Foreign Application Priority Data

Jul. 12, 2011  (JP) ................. 2011-154145

(51) Int. Cl.
*G01C 23/00*   (2006.01)
*B64G 1/24*    (2006.01)
(52) U.S. Cl.
CPC . *B64G 1/242* (2013.01); *B64G 1/24* (2013.01)
(58) Field of Classification Search
None
See application file for complete search history.

(56) References Cited

U.S. PATENT DOCUMENTS

| 6,184,831 B1* | 2/2001 | Dalby et al. .............. 342/465 |
| 2004/0083993 A1* | 5/2004 | Seale et al. .............. 123/90.11 |
| 2011/0162250 A1 | 7/2011 | Windauer et al. |
| 2012/0053878 A1* | 3/2012 | Windauer et al. .............. 702/94 |

FOREIGN PATENT DOCUMENTS

| JP | 10-505560 | 6/1998 |
| JP | 2007-182182 | 7/2007 |
| WO | 96/07587 | 3/1996 |

OTHER PUBLICATIONS

International Search Report issued Oct. 16, 2012 in International Application No. PCT/JP2012/067646.
(Continued)

*Primary Examiner* — Thomas Tarcza
*Assistant Examiner* — Adam Alharbi
(74) *Attorney, Agent, or Firm* — Wenderoth, Lind & Ponack, L.L.P.

(57) ABSTRACT

A flight control method and device for correcting a reference trajectory based on a distance from a current position to a target position in a spacecraft in flight. A CPU included in the spacecraft generates a reference trajectory which is a trajectory for allowing the spacecraft in flight to arrive at the target position on a celestial body with the atmosphere, and which is identified based on velocity or energy of the spacecraft and on drag acceleration of the spacecraft. The CPU calculates a ratio between the range that is a distance from the current position based on the reference trajectory to the target position, and the real range that is a real distance from a current position to the target position, and corrects the reference trajectory by calculating the drag acceleration in the reference trajectory using the calculated ratio.

5 Claims, 7 Drawing Sheets

(56) References Cited

OTHER PUBLICATIONS

Written Opinion of the International Searching Authority issued Oct. 16, 2012 in International Application No. PCT/JP2012/067646.

Jon C. Harpold and Claud A. Graves, "Shuttle program, Shuttle entry guidance", pp. 8-9 and 21, Feb. 1979.

Koichi Suzuki, "Reentry Guidance for Hypersonic Flight Experiment (HYFLEX) Vehicle (1st Report)", Technical Report of National Aerospace Laboratory, No. 1235, National Aerospace Laboratory of Japan, Apr. 2004, pp. 1-14.

Koichi Suzuki, "Trajectory Design and Reentry Guidance Law", National Aerospace Laboratory of Japan Tokubetsu Shiryo, No. 32, National Aerospace Laboratory of Japan, Sep. 1996, pp. 52-60.

* cited by examiner

FLIGHT CONTROL DEVICE, SPACECRAFT, AND REFERENCE TRAJECTORY CORRECTING METHOD

BACKGROUND OF THE INVENTION

1. Technical Field

The present invention relates to a flight control device, a spacecraft, and a reference trajectory correcting method.

2. Description of the Related Art

In order to allow a spacecraft to arrive at a ground surface, a water surface, or a predetermined altitude as a target position on a celestial body having the atmosphere (e.g. planets such as the Earth and Mars, and their moons) out of the atmosphere, that is, from outer space, a reference trajectory is found during flight of the spacecraft, which is a flight trajectory serving as a reference from a current position to the target position, and the spacecraft controls its body to fly in accordance with this reference trajectory.

The reference trajectory is identified based on a range that is a distance from the current position to the target position of the spacecraft, and on velocity or energy of the spacecraft. In the atmosphere, the spacecraft changes inclination of its body so as to change lift force generated on the body, thereby changing the velocity. For example, a capsule-type spacecraft changes inclination of its body by injecting gas, and a spacecraft having wings changes inclination of its body by changing control surfaces of the wings.

The flight trajectory of the spacecraft is generated with the reference trajectory guiding method, the closed form guidance method, and real-time trajectory generation method, etc., as described below, for example.

The reference trajectory guiding method identifies the reference trajectory based on the range and the velocity of the spacecraft as shown in FIG. 7A. Specifically, if the velocity of the spacecraft becomes a predetermined landing velocity, and the range becomes zero, the spacecraft can correctly arrive at the target position.

Specifically, in the reference trajectory guiding method, a single reference trajectory as well as influence on the range (sensitivity coefficient) by variation in parameters pertain to the flight are analyzed in advance on Earth, and data indicating the analyzed results (table data) are stored on a storage device. The spacecraft flies while correcting deviation from the reference trajectory by controlling the attitude of the body using the above data so as to fly at the velocity depending on the range.

In the closed form guidance method, as shown in FIG. 7B, the reference trajectory is identified based on the drag acceleration and the velocity (or energy) of the spacecraft within a range under constraint conditions. See Jon C. Harpold; Claud A. Graves, "Shuttle program. Shuttle entry guidance", pp. 8-9, pp. 21-24, (online), 1979, National Aeronautics and Space Administration, NASA, (searched on May 17, 2011), Internet <URL:http://ntrs.nasa.gov/search.jsp?N=0&Ntk=Report-Patent-Number&Ntt=NASA-TM-79949&Ntx=mode %20matchany&Ns=Loaded-Date|1>

Specifically, in the closed form guidance method, the reference trajectory is divided into plural phases, a reference trajectory is generated for each phase using a formula for annalistically calculating the range, and the formulas for all the phases are combined together to create the entire reference trajectory. The range is calculated using Formula (1) where R represents the range, V represents the velocity of the spacecraft, and D represents the drag acceleration.

$$R = \int \frac{V}{D} dV \quad (1)$$

It deviation occurs between the calculated range and the real range, the reference trajectory is corrected by adjusting a coefficient of an approximate formula for each phase.

In the real-time trajectory generation method, as shown in FIG. 7C, in the same manner as that in the closed form guidance method, the reference trajectory is identified based on the drag acceleration and the velocity (or energy) of the spacecraft. In the real-time trajectory generation method, the reference trajectory is calculated by calculating the behavior of the spacecraft in its flight using an equation of motion, and the range is calculated through numerical integration using Formula (1), and the reference trajectory is re-built from moment to moment using the equation of motion.

SUMMARY OF THE INVENTION

1. Technical Problem

In the reference trajectory guiding method, if the flight trajectory of the spacecraft deviates from the reference trajectory, variation in parameters corresponding to the deviation is read out from the table data, and the attitudeposture of the spacecraft is controlled based on the read out result. Hence, a data processor included in the spacecraft is not required to have high data processing performance. For generating the table data, however, analysis should be conducted under various conditions in advance, and consequently analysis required in advance becomes large-scale, and the storage device should store tremendous volume of data. The reference trajectory is generated on Earth in advance, and no correction is made in the reference trajectory itself; therefore, an error becomes increased until the spacecraft reaches the target position if the spacecraft has greatly deviated from the reference trajectory.

In the closed form guidance method, it is crucial whether or not the spacecraft can actually fly along the predefined reference trajectory. In the above-noted literature, an approximate formula is used in the calculation of a control instruction for flight in accordance with the reference trajectory, and thus an error becomes more increased until the spacecraft reaches the target position as the deviation of the spacecraft from the reference trajectory becomes greater. To address this problem, it is required to provide multiple approximate formulas depending on the deviation. As a condition of the approximation, it is assumed to employ equilibrium glide for balancing the lift force and gravity, and it is impossible to attain a great lift force in the spacecraft having a form with no wings to glide (such as a capsule-type spacecraft); thus this method is difficult to be applied to the spacecraft of this type.

In the real-time trajectory generation method, an equation of motion of the spacecraft is solved from moment to moment so as to continue updating the reference trajectory, which makes it possible to calculate the reference trajectory with high accuracy. Unfortunately, if data updating processing is carried out in the spacecraft, calculation load on the data processor mounted in the spacecraft becomes greater, so that it may require long time for the data processor with low data processing performance to calculate the reference trajectory, resulting in delay in updating of the reference trajectory. Such a case causes an increase in error until the spacecraft arrives at the target position.

An object of the present invention, which has been made in order to solve the problems according to the conventional art, is to provide a flight control device, a spacecraft, and a reference trajectory correcting method capable of correcting the reference trajectory based on a distance from the current position to the target position in the spacecraft in flight without using a data processor with high data processing performance.

2. Solution to the Problem

In order to solve the above problems, the following solutions are employed in the flight control device, the spacecraft, and the reference trajectory correcting method according to the present invention A flight control device according to the first aspect of the present invention is a flight control device for correcting a reference trajectory that is a trajectory for allowing a spacecraft in flight to arrive at a target position on a celestial body with an atmosphere, the reference trajectory being identified based on velocity or energy of the spacecraft and on drag acceleration of the spacecraft. The flight control device includes: a ratio calculating means for calculating a ratio between a distance from a current position based on the reference trajectory to the target position, and a real distance from a current position to the target position; and a correcting means for correcting the reference trajectory by calculating the drag acceleration in the reference trajectory using the ratio calculated in the ratio calculating means.

According to this configuration, the flight control device corrects the reference trajectory which is a trajectory for allowing the spacecraft in flight to arrive at the target position on a celestial body with the atmosphere, and which is identified based on the velocity or energy of the spacecraft and on the drag acceleration of the spacecraft; and this flight control device is included in the spacecraft.

The reference trajectory is generated in the spacecraft at the time of arriving at the celestial body with the atmosphere from outer space, that is, before entering the atmosphere, for example.

If the flight of the spacecraft in accordance with the reference trajectory is started, the ratio calculating means calculates the ratio between the distance from the current position based on the reference trajectory to the target position, and the real distance from the current position to the target position. The calculated ratio indicates a difference between the reference trajectory and the real flight trajectory.

The distance from the current position to the target position in accordance with the reference trajectory identified based on the velocity of the spacecraft and on the drag acceleration of the spacecraft is calculated using Formula (1) where R represents the distance, V represents the velocity of the spacecraft, and D represents the drag acceleration. The energy of the spacecraft may be used instead of using the velocity V of the spacecraft.

$$R = \int \frac{V}{D} dV \tag{1}$$

Formula (1) indicates that the distance based on the reference trajectory is proportional to the reciprocal of the drag acceleration.

The correcting means corrects the reference trajectory by calculating the drag acceleration in the reference trajectory using the ratio calculated in the ratio calculating means.

Specifically, if the distance calculated based on the reference trajectory is smaller than the real distance, that is, if the ratio value is less than 1, the drag acceleration becomes smaller by multiplying the drag acceleration by the ratio value, and the distance based on the reference trajectory is proportional to the reciprocal of the drag acceleration, as described above, so that the distance based on the reference trajectory becomes greater. On the other hand, if the distance based on the reference trajectory is greater than the real distance, that is, if the ratio value is more than 1, the drag acceleration becomes greater by multiplying the drag acceleration by the ratio value, and the distance based on the reference trajectory becomes smaller.

In this manner, the reference trajectory is corrected through a simple calculating method that calculates the drag acceleration in the reference trajectory using the ratio between the distance based on the reference trajectory and the real distance. The spacecraft flies in accordance with the reference trajectory corrected in this manner, thereby to more accurately arrive at the target position.

Accordingly, this configuration allows the spacecraft in flight to correct the reference trajectory based on the distance from the current position to the target position without using a data processor with high data processing performance.

In the first aspect, the reference trajectory is preferably calculated based on an equation of motion indicating a behavior of the spacecraft.

As a method of calculating the reference trajectory, there is such a method that defines the reference trajectory in advance in combination of simple formulas allowing for easy range calculation. This method, however, requires a great lift force for flight in accordance with the defined reference trajectory, and this method is difficult to be applied to a spacecraft having a form with no wings to glide (e.g. a capsule-type spacecraft) in which a great lift force cannot be attained.

This configuration is, however, applicable to even the reference trajectory calculated based on the equation of motion indicating the behavior of the spacecraft, which cannot be expressed by using simple formulas, and thus this configuration is also applicable to such a spacecraft that has a form incapable of gliding, and is capable of enhancing accuracy of the reference trajectory, as well. In the calculation of the reference trajectory based on the equation of motion, the equation of motion should be solved, and it takes some time for a data processor with a low processing performance to solve this equation, but this problem can be overcome by carrying out this calculation in a state of having sufficient time before entering the atmosphere.

In the first aspect, it is preferable that the ratio calculating means calculates the ratio at every predetermined time interval after the flight of the spacecraft in accordance with the reference trajectory is started until the spacecraft arrives at the target position, and the correcting means corrects the reference trajectory every time the ratio calculating means calculates the ratio.

According to this configuration, since the reference trajectory is corrected by using the simple calculating method, the reference trajectory can be corrected at every predetermined time interval after the flight of the spacecraft in accordance with the reference trajectory is started until the spacecraft arrives at the target position. Accordingly, this configuration allows the spacecraft to more accurately arrive at the target position.

A spacecraft according to the second aspect of the present invention includes the aforementioned flight control device, and flies to the target position in accordance with the reference trajectory corrected by the flight control device.

A reference trajectory correcting method according to the third aspect of the present invention is a reference trajectory correcting method of correcting a reference trajectory that is a trajectory for allowing a spacecraft in flight to arrive at a target position on a celestial body with an atmosphere, the reference trajectory being identified based on velocity or energy of the spacecraft and on drag acceleration of the spacecraft. The reference trajectory correcting method comprises: a first stage of calculating a ratio between a distance from a current position based on the reference trajectory to the target position, and a real distance from a current position to the target position; and a second stage of correcting the reference trajectory by calculating the drag acceleration in the reference trajectory using the ratio calculated in the first stage.

3. Advantageous Effects of the Invention

According to the present invention, such excellent effect can be attained that allows the spacecraft in flight to correct the reference trajectory based on the distance from the current position to the target position without using a data processor with high data processing performance.

DETAILED DESCRIPTION OF THE INVENTION

Hereinafter, one embodiment of a flight control device, a spacecraft, and a reference trajectory correcting method according to the present invention will be described with reference to drawings.

Figure 1:
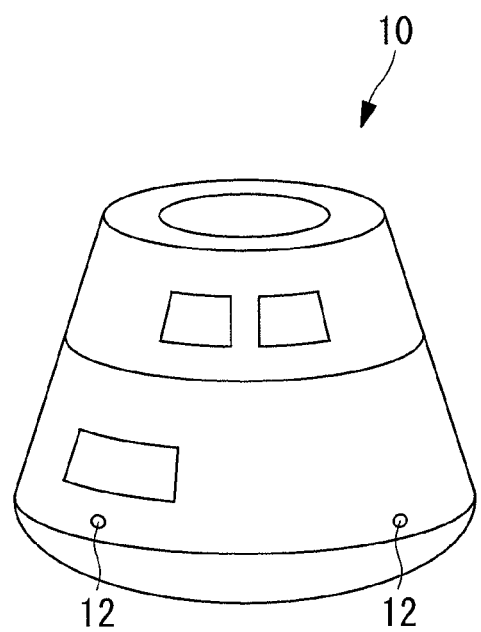
FIG. 1 is a drawing showing an outline of a spacecraft according to an embodiment of the present invention.

FIG. 1 is a drawing showing an outline of the spacecraft 10 according to the present embodiment.

The spacecraft 10 according to the present embodiment is a so-called capsule-type spacecraft, and is capable of entering the atmosphere from the outer space, and arriving at a target position (a ground surface or a water surface) on a celestial body with the atmosphere (such as the Earth and Mars, and their moons).

The spacecraft 10 changes inclination of its body in the atmosphere to change lift force generated on the body, thereby changing the velocity thereof. For example, in the capsule-type spacecraft 10 according to the present embodiment, inclination of the body is changed by injecting gas from multiple gas jet devices 12 mounted on a side face of the body, and others. The spacecraft 10 shown in FIG. 1 is an example of the spacecraft, and the gas jet devices 12 may be mounted on the body other than the side face, and the number of the gas jet devices 12 is not limited to that in the example of FIG. 1.

Figure 2:
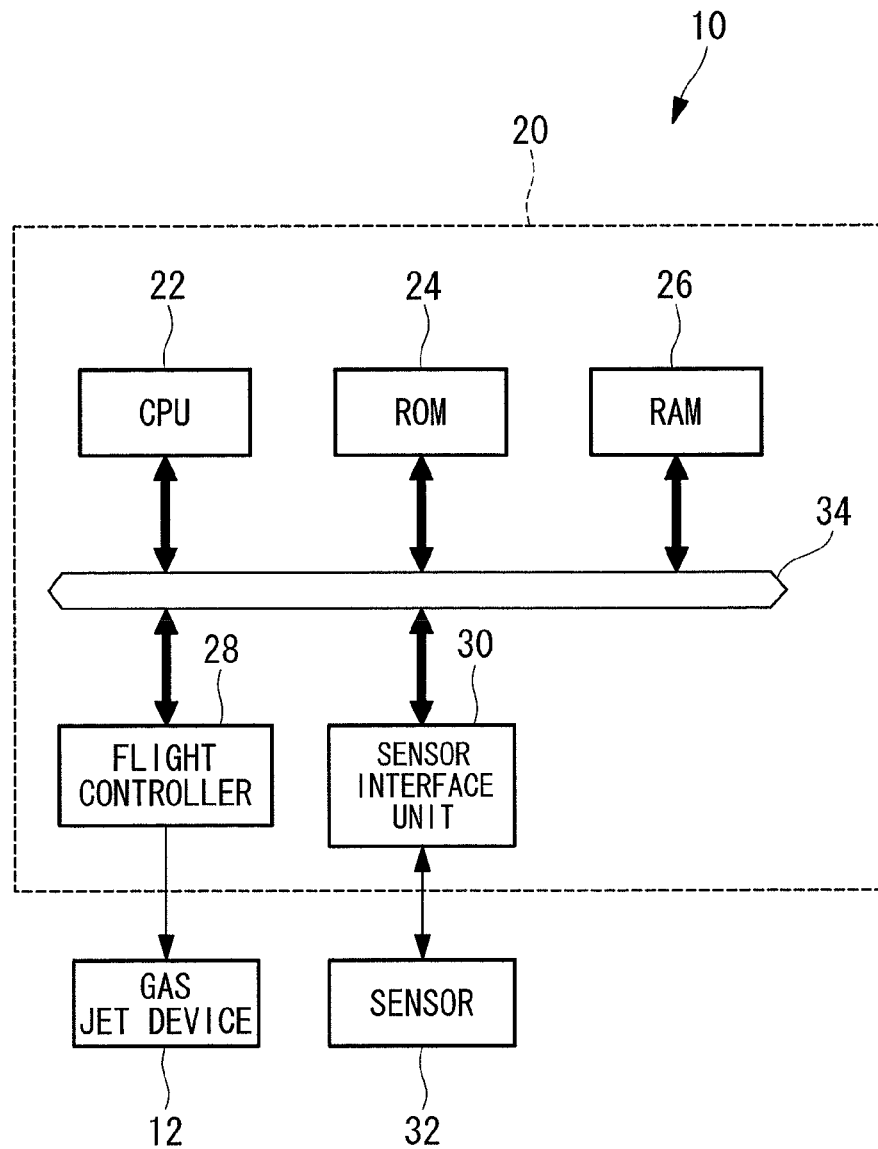
FIG. 2 is a block diagram showing an electric configuration of a flight control device included in the spacecraft according to the embodiment of the present invention.

FIG. 2 is a block diagram showing an electric configuration regarding a flight control device 20 included in the spacecraft 10 according to the present embodiment.

The spacecraft 10 according to the present embodiment includes a CPU (central processing unit) 22 that is an arithmetic unit for comprehensively controlling operations of the spacecraft 10, a ROM (read only memory) 24 that is a storage means storing various programs and various data in advance, and a RAM (random access memory) 26 used as a work area when the CPU 22 executes various programs.

The spacecraft 10 includes a flight controller 28 which is connected to the gas jet devices 12 each having a function of injecting gas from the body so as to control the gas jet devices 12, thereby controlling inclination of the spacecraft 10, and a sensor interface unit 30 connected to a sensor 32 so as to carry out input and output of data between the sensor 32 and the sensor interface unit 30. The sensor 32 includes an antenna for transmitting and receiving radio waves to the Earth, an acceleration sensor for measuring acceleration of the body, and a GPS (global positioning system) sensor for measuring the current position of the body, and others.

The CPU 22, the ROM 24, the RAM 26, the flight controller 28, and the sensor interface unit 30 are electrically connected to one another through a system bus 34. Hence, the CPU 22 can carry out various operations such as access to the ROM 24 and to the RAM 26, and input and output of data to the flight controller 28 and to the sensor interface unit 30, etc.

The CPU 22 integrates the acceleration measured on the acceleration sensor included in the sensor 32 so as to calculate the velocity of the spacecraft 10. The CPU 22 can also calculate the current position of the spacecraft 10 based on the result obtained by double-integrating the acceleration.

Figure 3:
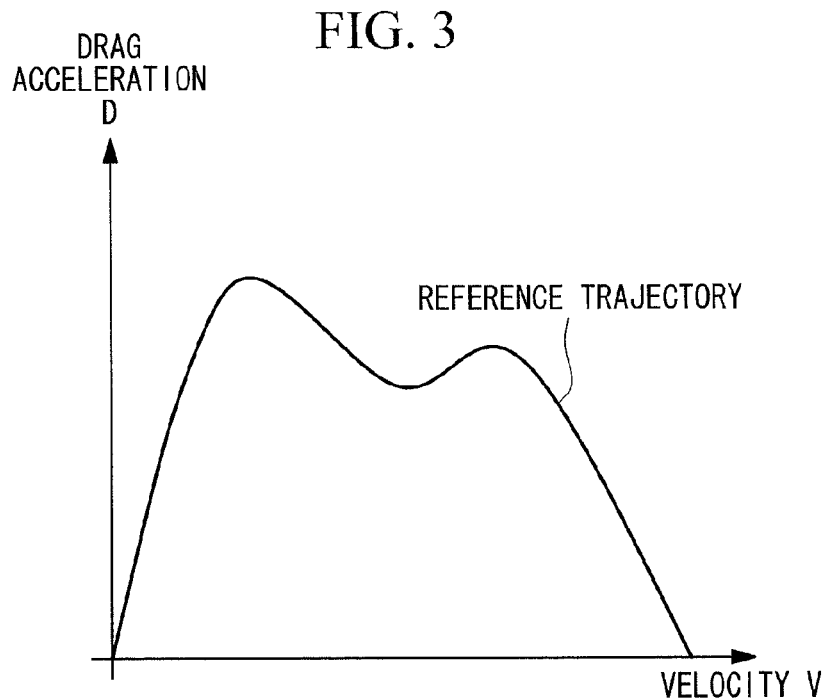
FIG. 3 is a graph showing a reference trajectory according to the embodiment of the present invention.

As the reference trajectory for entering the atmosphere, and arriving at the target position, the spacecraft 10 according to the present embodiment generates a reference trajectory identified based on the velocity and drag acceleration as shown in FIG. 3. The spacecraft 10 flies in accordance with this reference trajectory so as to arrive at the target position.

Figure 4:
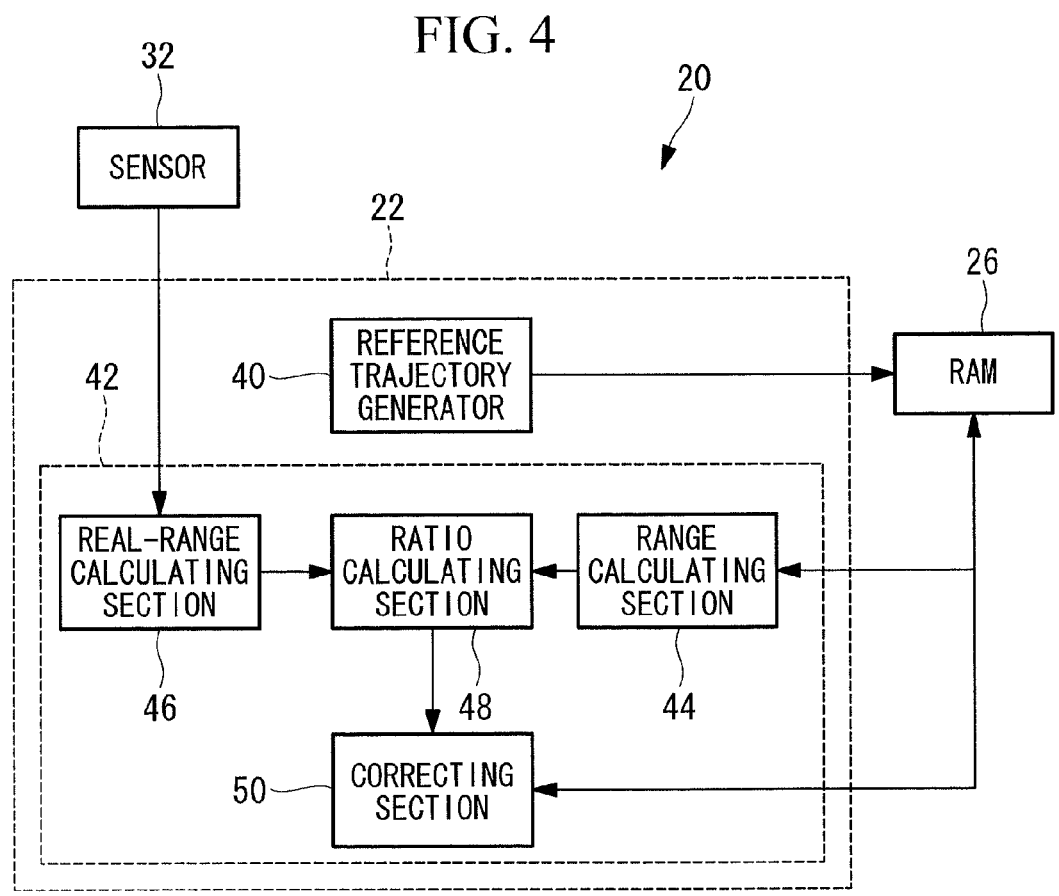
FIG. 4 is a functional block diagram showing a function regarding generation and correction of the reference trajectory in a CPU included in the flight control device according to the embodiment of the present invention.

FIG. 4 is a functional block diagram showing a function regarding generation and correction of the reference trajectory in the CPU 22 included in the flight control device 20.

The CPU 22 includes a reference trajectory generator 40 and a reference trajectory corrector 42.

The reference trajectory generator 40 analytically calculates the reference trajectory shown in FIG. 3 based on an equation of motion indicating a behavior of the spacecraft 10. This equation of motion is generated based on the velocity of the spacecraft 10 in a predetermined coordinate system, the mass of the spacecraft 10, and force applied onto the spacecraft 10, etc., for example. The reference trajectory generator 40 outputs the generated reference trajectory to the RAM 26 so as to store this reference trajectory on the RAM 26.

As the calculating method of the reference trajectory, there is such a calculating method for the reference trajectory that assumes the spacecraft to carry out the equilibrium glide balancing the lift force with gravity. This method, however, is not applicable to such a spacecraft that has no wings to glide so that it cannot attain a great lift force, as similar to the spacecraft 10 of the present embodiment. The reference trajectory generator 40 calculates the reference trajectory based on the equation of motion indicating the behavior of the spacecraft 10, and thus this configuration is applicable to a spacecraft having a form incapable of gliding, and can enhance accuracy of the reference trajectory.

The reference trajectory generator 40 generates the reference trajectory in advance before entering the atmosphere, which eliminates generation of the reference trajectory in a short time. Accordingly, the CPU 22 having the function as the reference trajectory generator 40 is not necessary to be a calculating device having high processing performance.

Meanwhile, the reference trajectory corrector 42 includes a range calculating section 44, a real-range calculating section 46, a ratio calculating section 48, and a correcting section 50.

The range calculating section 44 reads out the reference trajectory stored on the RAM 26, and calculates the range that is a distance from the current position based on the reference trajectory to the target position.

The range is calculated using Formula (1) where R represents the range, V represents the velocity of the spacecraft 10, and D represents the drag acceleration of the spacecraft 10.

$$R = \int \frac{V}{D} dV \quad (1)$$

As described above, Formula (1) indicates that the range R is proportional to the reciprocal of the drag acceleration D.

The real-range calculating section 46 calculates the real range that is a real distance from a current position to the target position based on the signal from the sensor 32, such as the acceleration sensor and the GPS sensor.

The ratio calculating section 48 calculates a ratio between the range based on the reference trajectory calculated in the range calculating section 44 and the real range calculated in the real-range calculating section 46 (range based on the reference trajectory/real range). Specifically, the ratio calculated in the ratio calculating section 48 indicates a difference between the reference trajectory and the real flight trajectory.

The correcting section 50 reads out the reference trajectory stored on the RAM 26, and calculates the drag acceleration in the reference trajectory using the ratio calculated in the ratio calculating section 48 so as to correct the reference trajectory.

Specifically, if the range calculated based on the reference trajectory is smaller than the real range, that is, if the ratio value is less than 1, the drag acceleration is multiplied by the ratio value so that the drag acceleration becomes smaller because the range based on the reference trajectory is proportional to the reciprocal of the drag acceleration, as described above; therefore the range based on the reference trajectory becomes greater. On the other hand, if the range based on the reference trajectory is greater than the real range, that is, the ratio value is more than 1, the drag acceleration is multiplied by the ratio value so that the drag acceleration becomes greater; therefore the range based on the reference trajectory becomes smaller.

The latest reference trajectory that is corrected on the correcting section 50 is output to the RAM 26, and the reference trajectory stored on the RAM 26 is updated with the newly corrected reference trajectory.

The reference trajectory corrector 42 according to the present embodiment corrects the reference trajectory through such a simple calculating method that calculates the drag acceleration in the reference trajectory using the ratio between the range based on the reference trajectory and the real range. The spacecraft 10 flies in accordance with the corrected reference trajectory, thereby more accurately arriving at the target position.

Figure 5:
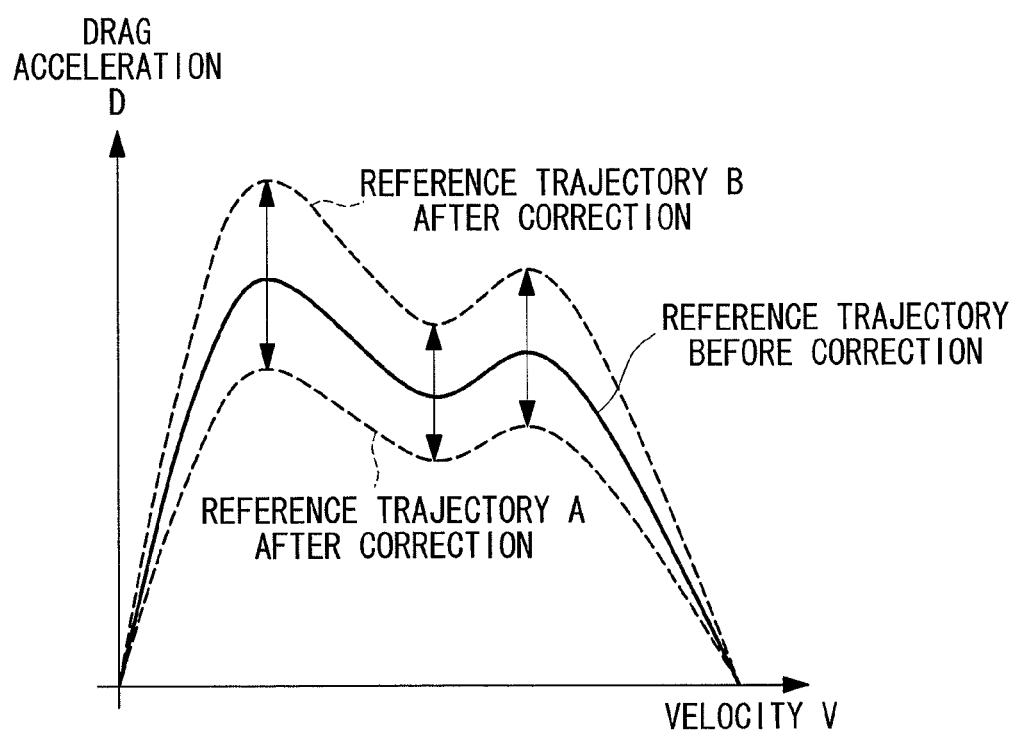
FIG. 5 is a graph showing the reference trajectory before and after the correction according to the embodiment of the present invention.

FIG. 5 is a graph showing the reference trajectory before and after the correction carried out by the reference trajectory corrector 42.

In FIG. 5, the reference trajectory A after the correction indicates that the ratio value between the range based on the reference trajectory and the real range becomes less than 1. On the other hand, the reference trajectory B after the correction indicates that the ratio value between the range based on the reference trajectory and the real range becomes more than 1. As shown in FIG. 5, the reference trajectory before the correction and the reference trajectory after the correction have each shape proportionally multiplied by the ratio value by which the drag acceleration is multiplied.

In the present embodiment, the CPU 22 embodies each processing of the above configuration elements by executing the reference trajectory correcting program.

Figure 6:
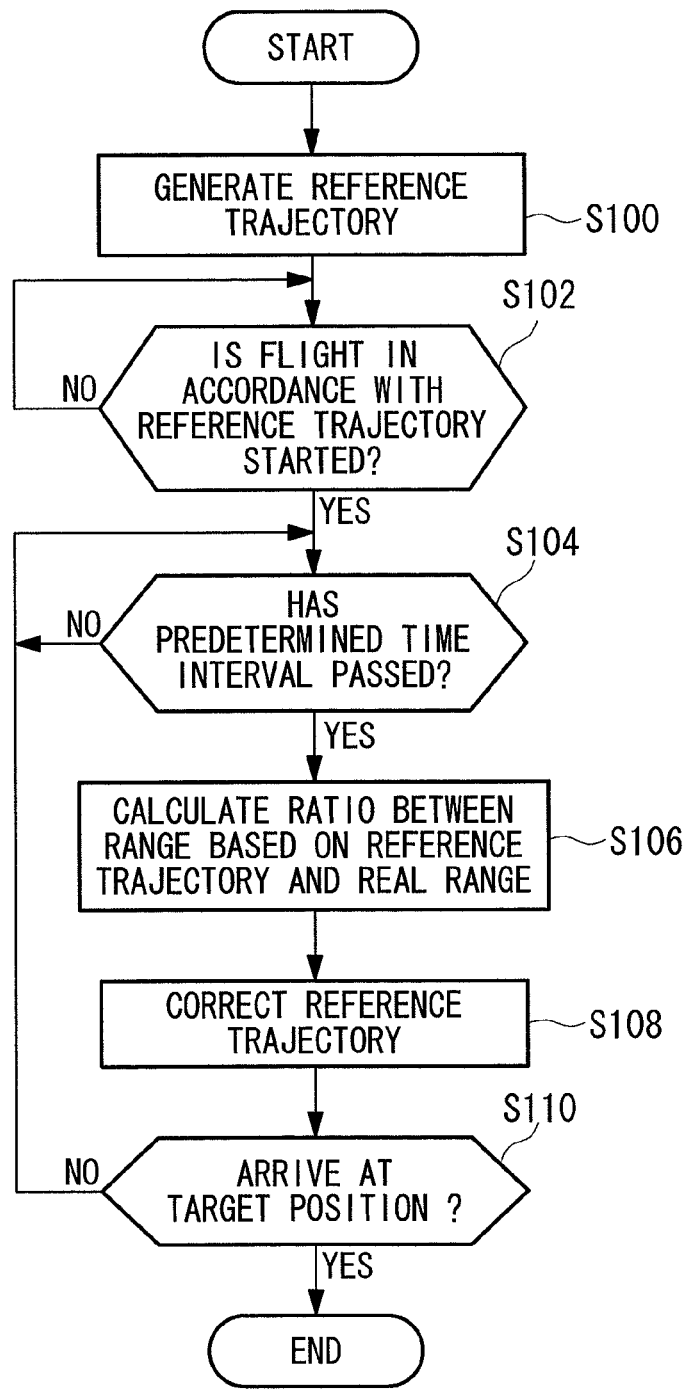
FIG. 6 is a flow chart showing a flow of a flight trajectory correcting program according to the embodiment of the present invention.
Figure 7A:
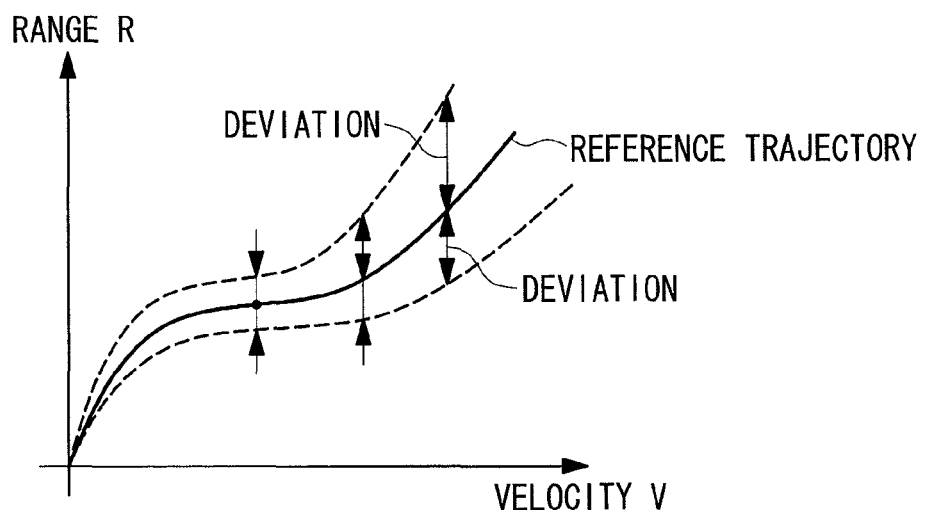
FIG. 7A is a drawing used for explaining a conventional method of correcting the reference trajectory, and showing the reference trajectory guiding method.
Figure 7B:
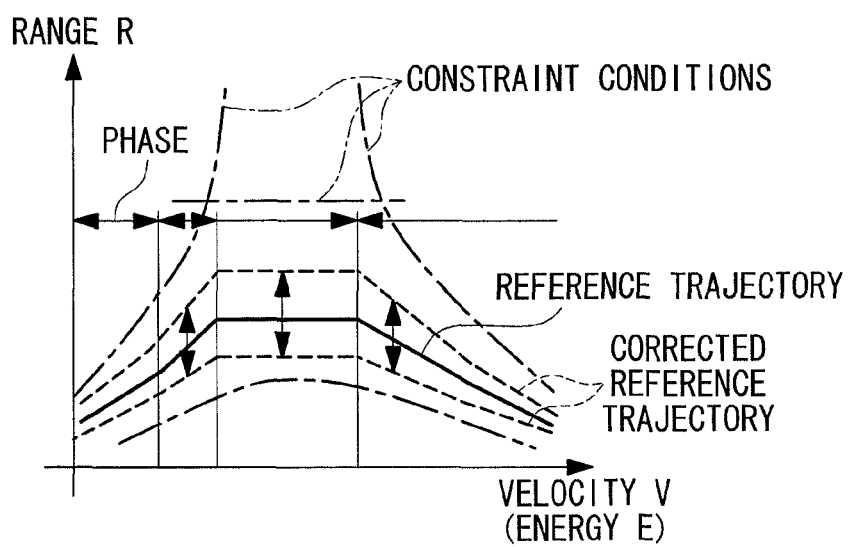
FIG. 7B is a drawing used for explaining a conventional method of correcting the reference trajectory, and showing the closed form guidance method.
Figure 7C:
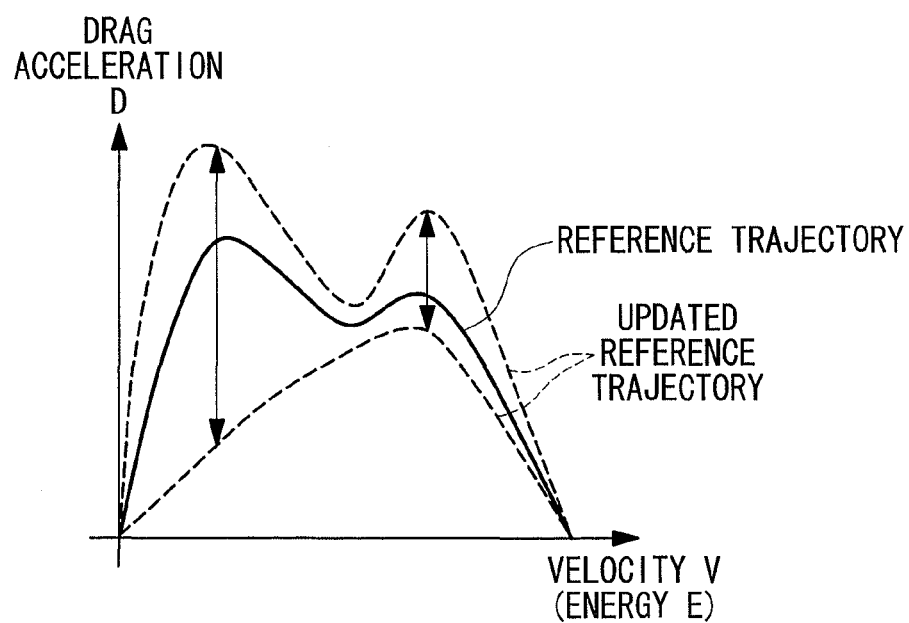
FIG. 7C is a drawing used for explaining a conventional method of correcting the reference trajectory, and showing the real-time trajectory generation method.

FIG. 6 is a flow chart showing a flow of the processing of the reference trajectory correcting program, and the reference trajectory correcting program is stored in a predetermined area of the ROM 24 in advance.

In step 100, the reference trajectory is generated. The reference trajectory is generated before the flight for the target position, that is, while the spacecraft 10 is located in the outer space before entering the atmosphere. The processing of this step 100 corresponds to the function of the reference trajectory generator 40.

In step 102, the processing is in a stand-by state until the spacecraft 10 starts its flight in accordance with the reference trajectory generated in step 100, and the processing shifts to step 104 if the flight is started.

In step 104, the processing is in a stand-by state until a predetermined time interval passes, and the processing shifts to step 106 if the time interval has passed.

In step 106, the ratio between the range based on the reference trajectory and the real range is calculated. The processing of this step 106 corresponds to each function of the range calculating section 44, the real-range calculating section 46, and the ratio calculating section 48.

In step 108, the reference trajectory is corrected using the ratio calculated in step 106. The processing of this step 108 corresponds to the function of the correcting section 50.

Accordingly, the spacecraft 10 flies to the target position in accordance with the reference trajectory after the correction.

In step 110, it is determined whether or not the spacecraft 10 has arrived at the target position, and if the determination is affirmative, this program is completed; and if the determination is negative, the processing returns to step 104 so as to repetitively execute the processing from step 104 to step 110 until the spacecraft 10 arrives at the target position.

As described above, the CPU 22 included in the spacecraft 10 according to the present embodiment generates the reference trajectory which is a trajectory allowing the spacecraft 10 in flight to arrive at the target position on a celestial body having the atmosphere, and which is identified based on the velocity of the spacecraft 10 and the drag acceleration of the spacecraft 10. The CPU 22 calculates the ratio between the range that is a distance from the current position based on the reference trajectory to the target position, and the real range that is a real distance from the current position to the target position, and calculates the drag acceleration in the reference trajectory using the calculated ratio, thereby correcting the reference trajectory.

Accordingly, the spacecraft 10 according to the present embodiment can correct the reference trajectory based on the distance from the current position to the target position while the spacecraft 10 is in a flight state without using a data processor with high processing performance.

Because the reference trajectory according to the present embodiment is calculated based on the equation of motion indicating the behavior of the spacecraft 10, this is applicable to the spacecraft 10 having a form incapable of gliding, and can enhance the accuracy of the reference trajectory.

The CPU 22 according to the present embodiment corrects the reference trajectory using the simple calculating method, and thus the reference trajectory can be corrected at every predetermined time interval after the flight of the spacecraft 10 in accordance with the reference trajectory is started until the spacecraft 10 arrives at the target position, thereby allowing the spacecraft 10 to more accurately arrive at the target position.

The present invention has been described by using the aforementioned embodiment, but the technical scope of the present invention is not limited to the scope set forth in the aforementioned embodiment. Various alternations or modifications may be added to the aforementioned embodiment without departing from the scope of the present invention, and such an embodiment to which the various alternations or modifications are added may also be included in the technical scope of the present invention.

For example, in the above embodiment, it has been described that the spacecraft 10 enters the atmosphere from outer space, and arrives at a ground surface or a water surface, but the present invention is not limited to this, and may be applicable to such a case that allows the spacecraft 10 to arrive at a ground surface or a water surface without allowing the spacecraft 10 to reach outer space because some kind of trouble is caused to the spacecraft 10 after launching, so that the mission is canceled.

In the above embodiment, it has been described that the reference trajectory is identified based on the velocity of the spacecraft 10 and the drag acceleration of the spacecraft 10, but the present invention is not limited to this, and the reference trajectory may be identified based on the energy of the spacecraft 10 and the drag acceleration of the spacecraft 10. The energy is the sum of the energy of the velocity and the potential energy, and thus the reference trajectory can be more accurately identified by using the energy rather than the velocity of the spacecraft 10 as the horizontal axis of the graph. In the case of identifying the reference trajectory based on the energy of the spacecraft 10 and the drag acceleration of the spacecraft 10, the energy E of the spacecraft 10 is used instead of using the velocity V of the spacecraft 10 in Formula (1).

In the above described embodiment, it has been described that the spacecraft 10 is a capsule-type spacecraft, but the present invention is not limited to this, and the spacecraft 10 may be a spacecraft having wings. In the spacecraft 10 having this form, inclination of the body is changed by changing control surfaces included in the wings, thereby changing the velocity of the body.

In the above embodiment, it has been described that the CPU 22 has each function of the ratio calculating section 48 and of the correcting section 50, but the present invention is not limited to this, and a calculating unit different from the CPU 22 may be equipped, which has each function of the ratio calculating section 48 and of the correcting section 50, and this calculating unit may be included in the flight control device 20.

In the above embodiment, it has been described that the CPU 22 included in the spacecraft 10 generates the reference trajectory, but the present invention is not limited to this, and the reference trajectory is not generated by the CPU 22, but the reference trajectory may be generated by means other than the spacecraft 10 in such a manner that the reference trajectory is generated in facilities on Earth, and is transmitted to the spacecraft 10, for example.

In addition, it may be configured that the ratio value calculated in the ratio calculating section 48 is stored on the RAM 26, and the flight controller 28 is allowed to execute the same processing as that of the correcting section 50 such that the flight controller 28 reads out the reference trajectory and the ratio value stored on the RAM 26, and carries out the multiplication, thereby correcting necessary part of the reference trajectory from moment to moment.

In the above described embodiment, it has been described that the ROM 24 and the RAM 26 are equipped as the storage devices, but the present invention is not limited to this, and a different storage device may be used for each of them, or one or more than two storage devices may be used for embodying both functions.

In the above embodiment, it has been described that the reference trajectory is generated only once before the spacecraft enters the atmosphere, but the present invention is not limited to this, and the real-time trajectory generation method or other reference trajectory generating methods may also be used in combination in such a manner, for example, that the reference trajectory is repetitively generated while the spacecraft is flying in the atmosphere, the reference trajectory stored on the storage device is updated every time a single reference trajectory is generated, and the aforementioned correcting method using the ratio of the range is employed during generating the reference trajectory.

In the above embodiment, it has been described that the drag acceleration is constantly multiplied by the ratio of the range in a simple manner, but the present invention is not limited to this, and the following processing may be employed: limiting the duration (velocity, energy, range, and drag acceleration, etc.) where the correction is carried out; once subjecting the ratio of the range to a calculation (calculation using an upper or lower limit, and/or conventional functions), and then multiplying the drag acceleration by this ratio of the range; or using them in combination; and dividing the flight duration into multiple phases, and subjecting the ratio of the range to a different calculation per every phase, and thereafter multiplying the drag acceleration by the ratio of the range.

The flow of the processing of the reference trajectory correcting program explained in the aforementioned embodiment has been described as an example of the present invention, and unnecessary steps may be deleted, new steps may be added, or the processing order may be changed without departing from the scope of the present invention.

REFERENCE SIGNS LIST

10 Spacecraft
20 Flight Control Device
42 Reference Trajectory Corrector
48 Ratio Calculating Section
50 Correcting Section

The invention claimed is:
1. A flight control device comprising:
a storage unit that stores reference trajectory that is a trajectory for allowing a spacecraft in flight to arrive at a target position on a celestial body with an atmosphere, the reference trajectory being identified based on velocity or energy of the spacecraft and on drag acceleration of the spacecraft;

a ratio calculating section that calculates a ratio between a distance from a current position based on the stored reference trajectory to the target position, and a real distance from a current position to the target position; and a correcting section that corrects the stored reference trajectory by calculating the drag acceleration in the stored reference trajectory using the ratio calculated in the ratio calculating section, and that updates the stored reference trajectory with the reference trajectory which has been corrected.

2. The flight control device according to claim 1, wherein the reference trajectory is calculated based on an equation of motion indicating a behavior of the spacecraft.

3. The flight control device according to claim 1, wherein:
the ratio calculating section calculates the ratio at every predetermined time interval after the flight of the spacecraft in accordance with the reference trajectory is started until the spacecraft arrives at the target position; and the correcting section corrects the reference trajectory every time the ratio calculating section calculates the ratio.

4. A spacecraft including the flight control device according to claim 1, wherein the spacecraft flies to the target position in accordance with the reference trajectory which is stored in the storage unit of the flight control device.

5. A reference trajectory correcting method comprising:
a first stage storing a reference trajectory that is a trajectory for allowing a spacecraft in flight to arrive at a target position on a celestial body with an atmosphere, the reference trajectory being identified based on velocity or energy of the spacecraft and on drag acceleration of the spacecraft;

a second stage of calculating a ratio between a distance from a current position based on the stored reference trajectory to the target position, and a real distance from a current position to the target position; and a third stage of correcting the reference trajectory by calculating the drag acceleration in the stored reference trajectory using the ratio calculated in the second stage and updating the stored reference trajectory with the reference trajectory which has been corrected.

* * * * *